（12）United States Patent
Candy et al.

(10) Patent No.: US 11,899,156 B2
(45) Date of Patent: Feb. 13, 2024

(54) METAL DETECTOR

(71) Applicant: Minelab Electronics Pty. Limited, Mawson Lakes (AU)

(72) Inventors: Bruce Halcro Candy, Mawson Lakes (AU); Eng Leng Mah, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 18 days.

(21) Appl. No.: 17/574,858

(22) Filed: Jan. 13, 2022

(65) Prior Publication Data

US 2022/0308250 A1 Sep. 29, 2022

(30) Foreign Application Priority Data

Mar. 25, 2021 (AU) ................. 2021900893

(51) Int. Cl.
*G01V 3/10* (2006.01)
(52) U.S. Cl.
CPC ...................... *G01V 3/10* (2013.01)
(58) Field of Classification Search
None
See application file for complete search history.

(56) References Cited

U.S. PATENT DOCUMENTS 4,942,360 A 7/1990 Candy
7,924,012 B2 * 4/2011 Candy ............... G01V 3/107
324/329

(Continued)

*Primary Examiner* — Patrick Assouad
*Assistant Examiner* — Haidong Zhang
(74) *Attorney, Agent, or Firm* — The Webb Law Firm

(57) ABSTRACT

Provided is a method for detecting a metal target in soil using a metal detector including the steps of generating a transmit magnetic field for transmission into the soil using a transmit winding based on a transmit signal; receiving a first receive magnetic field using the transmit winding during a receive period to produce a first receive signal; and receiving a second receive magnetic field using a receive winding during the receive period to produce a second receive signal. The transmit winding and the receive winding are separated spatially; and producing an indicator output signal based on the first receive signal, the second receive signal and at least one synchronous demodulation function. The first receive signal includes first parameters that define a first transfer function transforming the first receive magnetic field into the first receive signal. The first parameters include an effective number of turns, a geometry of the transmit winding, and first electronic amplification transfer functions between the transmit winding and first receive signal. The second receive signal includes second parameters that define a second transfer function transforming the second receive magnetic field into the second receive signal. The second parameters include an effective number of turns, a geometry and a relative orientation of the receive winding with respect to the transmit winding, and second electronic amplification transfer functions between the receive winding and second receive signal. The first parameters and the second parameters are selected such that the first receive signal and the second receive signal are processed together to reduce or null detected signals within the indicator output signal due to received soil eddy currents from conducting soil components manifested in the first receive signal and the second receive signal; and where the selection of the first parameters relative to the second parameters are dependent on the synchronous demodulation function.

10 Claims, 3 Drawing Sheets

(56) References Cited

U.S. PATENT DOCUMENTS

| | | | | |
|---|---|---|---|---|
| 9,250,348 B2* | 2/2016 | Candy | ............ | G01V 3/107 |
| 2008/0297158 A1* | 12/2008 | Heger | ............ | G01V 3/107 |
| | | | | 324/326 |
| 2017/0299753 A1 | 10/2017 | Candy | | |

* cited by examiner

| Soil Type | No Calibration for Conductive Soil | Hardware Calibrated for EMI Cancellation | Hardware Calibrated for Conductive Soil Cancellation |
|---|---|---|---|
| Benign, Non-conductive | No unwanted signal | No unwanted signal | No unwanted signal |
| Mineralised, Non-conductive | No unwanted signal | No unwanted signal | No unwanted signal |
| Benign, Conductive | Depending on level of conductivity, unwanted signal range from small to large | Some unwanted signal | No unwanted signal |
| Mineralised, Conductive | Depending on level of conductivity, unwanted signal range from small to large | Some unwanted signal | No unwanted signal |
| Beach, Dry Conductive Sand | No unwanted signal | Some unwanted signal | No unwanted signal |
| Beach, Damp Conductive Sand | No unwanted signal | Significant amount unwanted signal | No unwanted signal |
| Beach, Wet Conductive Sand | Significant amount unwanted signal | Significant amount unwanted signal | No unwanted signal |

*Fig. 3*

METAL DETECTOR

CROSS-REFERENCE TO RELATED APPLICATION

This application claims priority to Australian Provisional Patent Application No. 2021900893 filed Mar. 25, 2021, the disclosure of which is hereby incorporated by reference in its entirety.

BACKGROUND OF THE INVENTION

Field of the Invention

The present invention relates to a metal detector.

Description of Related Art

The general forms of most metal detectors which interrogate soil are either handheld battery operated units, conveyor-mounted units, or vehicle-mounted units. Examples of handheld products include detectors used to locate gold, explosive land mines or ordnance, coins and treasure. Examples of conveyor-mounted units include fine gold detectors in ore mining operations, and examples of a vehicle-mounted unit include a unit to locate buried land mines.

These metal detectors usually, but not necessarily, consist of transmit electronics generating a repeating transmit signal cycle of a fundamental period, which is applied to an inductor, for example a transmit winding, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or demodulated, to produce one or more target channels, the one or more target channels may be further processed to produce the indicator output signal.

SUMMARY OF THE INVENTION

According to an aspect of the present disclosure, there is provided a method for detecting a metal target in soil using a metal detector comprising the steps of: generating a transmit magnetic field for transmission into the soil using a transmit winding based on a transmit signal; receiving a first receive magnetic field using the transmit winding during a receive period to produce a first receive signal; receiving a second receive magnetic field using a receive winding during the receive period to produce a second receive signal, wherein the transmit winding and the receive winding are separated spatially; and producing an indicator output signal based on the first receive signal, the second receive signal and at least one synchronous demodulation function; wherein the first receive signal includes first parameters that define a first transfer function transforming the first receive magnetic field into the first receive signal, the first parameters including an effective number of turns, a geometry of the transmit winding, and first electronic amplification transfer functions between the transmit winding and first receive signal; wherein the second receive signal includes second parameters that define a second transfer function transforming the second receive magnetic field into the second receive signal, the second parameters including an effective number of turns, a geometry and a relative orientation of the receive winding with respect to the transmit winding, and second electronic amplification transfer functions between the receive winding and second receive signal; wherein the first parameters and the second parameters are selected such that the first receive signal and the second receive signal are processed together to reduce or null detected signals within the indicator output signal due to received soil eddy currents from conducting soil components manifested in the first receive signal and the second receive signal; and wherein the selection of the first parameters relative to the second parameters are dependent on the synchronous demodulation function.

In one form, the gains are applied to the first receive signal and the second receive signal through the steps of: applying a first gain to the first receive signal to produce a first gain signal; applying a second gain to the second receive signal to produce a second gain signal, wherein the second gain is lower than the first gain; and processing the first gain signal with the second gain signal to reduce or eliminate the unwanted signals due to conducting soil manifested in different amounts in the first receive signal and the second receive signal.

In one form, the step of processing the first gain signal and the second gain signal comprises: subtracting the second gain signal from the first gain signal.

In one form, the transmit winding and the receive winding overlap partially so that the receive winding is nulled with respect to the transmit winding.

In one form, the transmit winding and the receive winding form a double D coil.

In one form, the transmit winding and the receive winding form a concentric coil.

In one form, the second gain is a factor of 0.65 to 0.95 of the first gain.

In one form, the conducting soil components comprising salt water.

According to another aspect of the present disclosure, there is provided a metal detector configured to perform the method of any one of above aspect and forms.

BRIEF DESCRIPTION OF DRAWINGS

Embodiments of the present disclosure will be discussed with reference to the accompanying drawings wherein:

FIG. 3 depicts a table presenting various test results with and without embodiments of the present disclosure.

DESCRIPTION OF EMBODIMENTS

Figure 1:
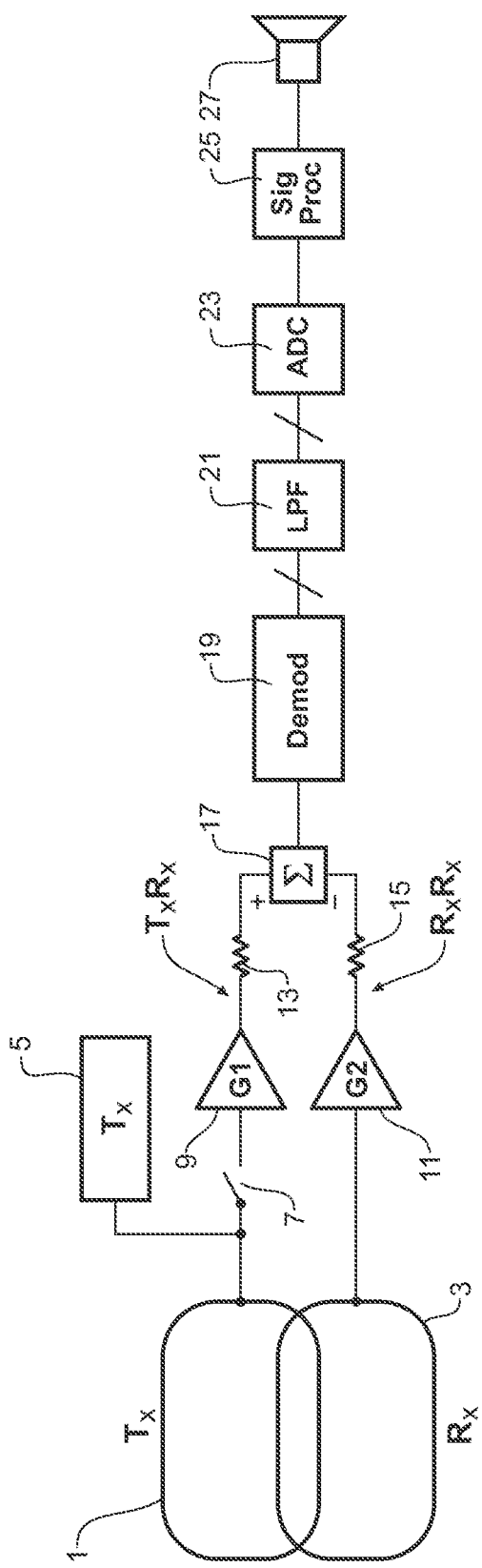
FIG. 1 depicts block diagrams of a metal detector according to an embodiment of the present disclosure.

In this disclosure, the term "winding" refers a wound inductance consisting of multiple conductive wire turns. For example, a Double-D coil, also known as a DD coil, comprises two partially over-lapping windings, each comprises turns of conductive wires. The cross-sectional winding profile of most metal detector windings is usually compactly bundled, for example, the cross-sectional shape may be approximately square, or circular, or rectangular.

Conducting soil, such as that encountered near salt-water beaches, salt flats or areas of soil with high salt content, and alkali or acidic soils particularly after rain has occurred, is a source of detected interfering noise in metal detectors. Some commercial metal detectors are designed to reduce the effects of detecting soil conductive signals. For example, some detectors are designed with so called "time-domain" electronics, such as the well-known pulse induction electronics, rather than "frequency domain" (such as single frequency sinewave transmission) to reduce the effects of signals from conductive soils. Other detectors employ specific demodulation functions which cancel the signals from conductive soil, such as that described in US2017299753. Multi-frequency metal detectors may also have the capability of reducing the effects of conductive soil signals as described in U.S. Pat. No. 4,942,360. However, the most common method used by gold prospectors is utilising a coil with a receive winding, or windings, nulled to far fields, such as a "figure-8" receive winding, usually with a circular transmit winding surrounding the said figure-8 receive winding.

However, it is possible to improve upon all of the above methods to achieve greater capability to find more gold nuggets in soils containing simultaneously both conductive and magnetic soils, which are present in many gold-fields. This invention describes such a method.

A PI or PI-like transmit magnet field consists of a repeating sequence of periods of changing transmitted fields alternating with periods of constant transmitted magnetic field, wherein the latter may include a zero and/or finite constant transmitted field. Receive measurements may occur during either the changing or constant transmitted field. The receive periods during the zero (or constant) transmitted field are of relevance to this invention, when responding to eddy currents induced in conductive soils during the changing transmitted field periods.

For ease of understanding, assume that the soil is a uniform conductive half-space with a flat horizontal surface, and that the transmit winding is planar and symmetrically circular with an axis perpendicular to the said soil's surface, and further, the transmit winding is placed upon the soil's surface. During the changing magnetic field periods, transmitted energy is imparted to the conductive soil and manifests in the form of eddy currents that are symmetrically circular about the transmit winding axis, such that the circular eddy current density is highest close to the circular transmit winding, with a reduction of the eddy current density both with increasing depth below the transmit winding and out radially from the winding's vertically orientated axis (beyond a certain diameter).

The said induced eddy currents generate a magnetic field in accordance with Maxwell's equations. At the surface, on axis with the transmit winding, this eddy current generated magnetic field is thus vertically ("z" direction) orientated. During the transmit periods of zero (or constant) transmitted fields, the said eddy currents decay.

The "late period" form of this decay to a transmitted magnetic field step function approximates being proportional to:

$$b_z(t) \propto \frac{1}{t^{1.5}}$$

where $t=0$ at the step function transition, measured as a vertical (z direction) on-axis component at the soil's surface. $b_z(t)$ is (by definition) the aggregate decaying field measured on axis at the soil surface from the contributions of at this location, from all the circular eddy current path that are decaying throughout the conductive soil medium, with each such scaled circular path current "toroidal filament" symmetrical about the z axis having an associated decay time constant. The inductive component of each said scaled toroidal shaped filament varies according to its radius about the central axis, and proximity to the soil surface; the greater the radius, the longer the associated time-constant, with scaled toroidal filaments near the surface having shorter decay periods for a given radius compared to deeper filaments due to effective increased resistance and decreased effective inductance of filament toroidal loops intersect with the ½ space boundary. A magnetic step response may be approximately generated as an applied voltage impulse response to the transmit winding, namely, the well-known short duration back-emf. Thus, the soil eddy currents magnetic field on axis at the surface may be determined from any transmitted waveform via the convolution integral.

Thus, after $t=0$, initially the smaller radius eddy current filaments with short time-constants; particularly those near the transmit winding, decay fastest, and the deeper scaled larger radius toroidal filaments decay at a slower rate (due to a higher inductive to resistive ratio). However, initially (at $t=0$), the smaller radius shallower currents are higher in current density and have higher mutual coupling coefficient with the transmit winding than the deeper larger radius filaments, and have a higher rate of decay. Hence, in effect shortly after $t=0$, the smaller shallower current loops dominate relatively, but these decay away fastest leaving progressively larger and larger and deeper and deeper current loops dominating. Visually, the currents thus look like expanding radius and mean cross-sectional area toroidal-like current paths propagating deeper and deeper, but with decreasing intensity with time, and decreasing rate of change of decay. The maximum of these toroidal current rings propagate into the conducting half-space at approximately $$\frac{2}{\sqrt{\pi\sigma\mu_0 t}} \text{ ms}^{-1}$$

with a radius of $$\sqrt{\frac{4.4t}{\sigma\mu_0}} \text{ m.}$$

Thus, the distance the said toroidal ring's current maxima propagates below the earth at $t=\delta$ seconds is approximately:

$$\int_0^\delta \frac{2dt}{\sqrt{\pi\sigma\mu_0 t}} = \frac{4\sqrt{\delta}}{\sqrt{\pi\sigma\mu_0}}$$

Thus suppose for example, the half-space conductivity $\sigma=2$, about half that of seawater, and $\delta=5.5$ μs, then the dominant current ring would have propagated about 3.3 m down into the earth and have a radius of about 2.8 m. However, even though this peak current ring would be far from a typical hand-held metal detector coil with a diameter of 0.7 m for example, nevertheless the shallower smaller radius but weaker currents loops closer to the winding dominate the receive signal in the transmit winding due to their higher mutual coupling to the transmit winding than the deeper broader peak current loop. That is, the salient point being that the source of the decaying half-space signal in the transmit winding progressively becomes more distant from the coil with time.

Now consider a nulled DD coil, wherein for simplicity of understanding, the receive winding is identical in shape and turns to the transmit winding, and assume the DD coil is placed upon the conductive half-space surface. In comparison to an emf induced in the transmit winding due to the said soil eddy current decay, an emf induced in the receive winding is initially lower of that of the transmit winding (due to the offset of the receive winding from the transmit winding effective central axis), but the induced emfs in each winding asymptotically approach each other in magnitude at later times when the dominant emf inducing transmitting eddy current loops are far from the said windings compared to their diameters. The emf induced in the transmit winding is the time derivative of $b_z(t)$, being $$emf = \frac{I(nr)^2 \sigma^{1.5} \mu^{2.5}}{20\sqrt{\pi} \, t^{2.5}}$$

where n is its number of turns and r its radius, and the other terms their usual standard meaning. A simplified insight as to why this has the $$\frac{1}{t^{2.5}}$$

relationship compared to the response to, for example, log-uniform distributed VRM time constants giving an induced emf of $$\frac{1}{t}$$

to a step response, in principle qualitatively could be thought of in terms of the longer deeper greater radius current loops progressively inducing relatively much weaker emfs with time resulting in the more rapid decay of these soil conductive components compared to log-uniform distributed time-constant VRM soil components.

Hence, if the induced emf's are measured in each winding, and then each synchronously demodulated (sampled) and averaged (signal processing) commencing at a period when the eddy current paths responsible for most of the induced emf in the transmit winding is of the order of the diameter of the nulled coil, the said synchronously demodulated average from the transmit winding will be different. However, the receive winding at later times when the emf magnitudes are small but more equal.

Thus, assuming all else equal, the said post averaged synchronously demodulated magnitude differences between that from the transmit winding and that from the receive winding are dependent on:

a. The delay of commencement of demodulation following a transition of rapid change in transmit signal current to zero or constant current;

b. The said demodulation gain function for a short while thereafter; and c. The size of the nulled coil.

For example, a metal detector with a 14" DD coil, and synchronous demodulation effectively commencing at about 5.5 μs post back-emf period, (relevant group delays need to be taken into account), results in effectively the transmit winding signal's synchronous demodulated averaged signal resulting from the uniform half-space to be about 19% higher than that from the receive winding, all else being equal. Thus subtracting 1.19× the receive signal from 1× the transmit winding signal post synchronous demodulation would approximately null the said signals resulting from a conductive half-space.

Alternatively, the linear combination may be affected before the synchronous demodulation process. It is clear from the above that a different sized coil, or different commencing synchronous demodulation function would require this said ratio to be different. Note that parameters such as winding effective areas, turns ratio, electronic gains need to be taken into account when determining what the ratio of subtracted signals between the transmit winding receive and receive winding signal paths should be to effect a null. The linear combination may also be dependent on the synchronous demodulation functions.

As the emf signal of the form $1/t^{2.5}$ decays relatively rapidly with time, in particular when the decay is dominated from the deeper eddy current toroidal loops, it follows that these latter deep contributions do not contribute much to the averaged synchronous demodulation magnitude compared to earlier periods. Thus, if instead the uniform conducting half-space soil is limited in depth to a uniform conductive layer of soil at the surface (for example, the soil sits on top of a rock base), the cancellation of such the conductive component could be reasonably approximated to that of a uniform conductive half space. Similarly, radially the conductivity may be limited in extent and still approximate the said half-space response.

A metal detector with no or an incomplete capability of substantially reducing or nulling out the effects of signals from conductive soils exhibits low frequency laterally and vertically spatial as detected interference (noise) signal components, due to in effect, these relatively deeply detected eddy currents as a source in PI or PI-like metal detectors. The interference magnitude may be considerably higher than the potential signal from actual buried metal targets in some soils. In fact, even if the coil is raised and lowered relative to the soil's surface, at several meters above the soil's surface for some conductive soils, such conductive eddy current components may easily be noted by the prospector. Hence, it is highly desirable to reduce such signals when detecting in significantly conductive soils.

It should be noted that other forms of coil other than a DD cited above, may also apply to the present disclosure, with the ability to reduce the effects of signals due to conducting soil, for example, a concentric coil, as long as there are two separate windings for receiving signals.

Accordingly, the present disclosure presents an elegant solution to the above problem. In a broad aspect, the net gain of signal paths of that of the receive winding, and, that of the transmit winding, may be compared in effect via subtraction to reduce or null out the relative signal from the conductive soil components from each said winding. These signal paths gain factors include the effective area of each winding, their relative orientation, and number of turns of each said winding, and the electronic amplification magnitudes applied to each said winding, including any different gains set in synchronous demodulation of signals (if the linear combination is performed post synchronous demodulation) from both said windings. The gains can be applied in analogue and/or in digital form.

The reason why this method may produce greater gold nugget finds on balance for a prospector compared to other methods include the following factors:

a. Unlike the popular figure-8 receive winding surrounded by a transmit winding, which nulls out far fields, this invention has the advantage of utilising the transmit winding as both a transmit and receive winding, and thus exploits the intrinsic advantage of such a "mono-loop" winding capability; namely, the high sensitivity to shallow targets.

b. Unlike the popular figure-8 receive winding surrounded by a transmit winding, this invention also exploits the asymmetry of the coil wherein the transmit winding of the coil side has relatively higher sensitivity to medium depth metal targets, because this side acts locally as both the transmit side and a receive side.

c. Unlike the various demodulation schemes that null out these conductive soil eddy current signals, which typically include a reduction in detected target signals owing to their higher order synchronous demodulation signal function cancellation, this method requires no need for synchronous demodulation transfer functions intrinsically to cancel out such conduction half space signals, thus rendering potentially greater target signals in many instances.

FIG. 1 depicts block diagrams of a metal detector according to an embodiment of the present disclosure. In this embodiment, a transmit winding 1 together with a receive winding 3 form a DD coil, acting as the sensor head or antenna of a metal detector. The transmit winding 1 is connected to transmit electronics 5, and also connected to a preamplifier 9 with gain G1 through a switch 7. During a transmit period, the switch 7 is opened, while during a receive period, the switch 7 is closed. This is to prevent transmit signals, sent from transmit electronics 5 to transmit winding 1, from being fed into preamplifier 9. The receive winding 3 is connected to preamplifier 11 with gain G2. During a receive period, both transmit winding 1 and receive winding 3 are used to receive signal. The received signals are fed through respective preamplifier 9 and preamplifier 11 and respective mixing resistors 13, 15, before being combined at summer 17 with the effect of the signals from the receive winding 3 subtracted from the signals from the transmit winding 1. Of course, the same can be achieved by subtracting the signals from the transmit winding 1 from the signals from the receive winding 3. The resultant signals may then be stored or further processed. For example, in this embodiment, the resultant signal is first demodulated through demodulator 19, filtered by a low pass filter 21, converted to digital form through ADC 23 for signal processing unit 25. The signal processing unit 25 may then examines whether there is any sign of a wanted target. If there is, an output indicative signal is sent to an operator of the metal detector. In this case, a sound is created through speaker 27.

The cancellation of the signals due to conducting soil may be achieved by having a different number of turns for the transmit 1 and receive windings 3, different gains for the two preamplifiers 9, 11 and different mixing resistors 13, 15 (basically the same as the gains), or a combination of all.

Figure 2:
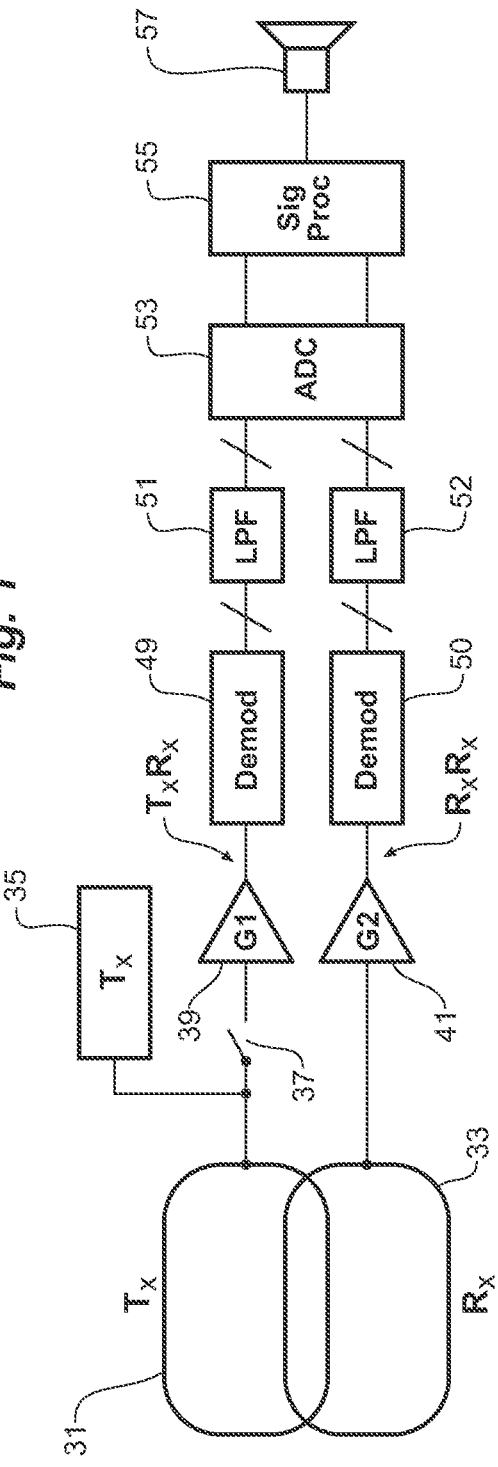
FIG. 2 depicts block diagrams of a metal detector according to another embodiment of the present disclosure.

FIG. 2 depicts block diagrams of a metal detector according to an embodiment of the present disclosure. In this embodiment, a transmit winding 31 together with a receive winding 33 form a DD coil, acting as the sensor head or antenna of a metal detector. The transmit winding 31 is connected to transmit electronics 35, and also connected to a preamplifier 39 with gain G1 through a switch 37. During a transmit period, the switch 37 is opened, while during a receive period, the switch 37 is closed. This is to prevent transmit signals, sent from transmit electronics 35 to transmit winding 31, from being fed into preamplifier 39. The receive winding 33 is connected to preamplifier 41 with gain G2. During a receive period, both transmit winding 31 and receive winding 33 are used to receive signal. The received signals are fed through respective preamplifier 39 and preamplifier 41 into their respective demodulators 49, 50. Outputs from the demodulators 49, 50 are fed into their respective low pass filters 51, 52. The filtered signals are then converted to digital form through ADC 53 for signal processing unit 55. The signal processing unit 55 processes the digital signals to remove signals due to conducting soil from the receive signals, then examines whether there is any sign of a wanted target. If there is an output indicative signal is sent to an operator of the metal detector. In this case, a sound is created through speaker 57.

In this embodiment, in one form, the transmit winding 31 and the receive windings 33 may have the same number of turns (for example, using typical commercially available DD coil), with the preamplifier 39, 41 gains the same, and the cancellation is performed digitally in the signal processing unit 55.

FIG. 3 depicts a table presenting various test results with and without embodiments of the present disclosure. The test results are also compared with test results of a metal detector using a known EMI cancellation. It can be seen that with the implementation of an embodiment of the present disclosure may improve the performance of a metal detector, in particular when used on conducting soils.

To elaborate further, the table of FIG. 3 lists test results obtained in various coil types, including benign, non-conductive soil, mineralised, non-conductive soil, benign, conductive soil, mineralised, conductive soil, beach with dry conductive sand, beach with damp conductive sand, and beach with wet conductive sand. The first set of test results is obtained using a metal detector without any calibration for conductive soil. The second set of test results is obtained using a metal detector with known EMI cancellation. The third set of test results is obtained using a metal detector with conductive soil cancellation based on the present disclosure. The metal detector with conductive soil cancellation based on the present disclosure works well on various soil types involved in the test. The metal detector with known EMI cancellation is performing better than the metal detector without any calibration for conductive soil, but is still affected by signals due to conductive soil. The metal detector with known EMI cancellation performs as poorly as the metal detector without any calibration for conductive soil on top of beach with wet conductive sand.

Figure 4:
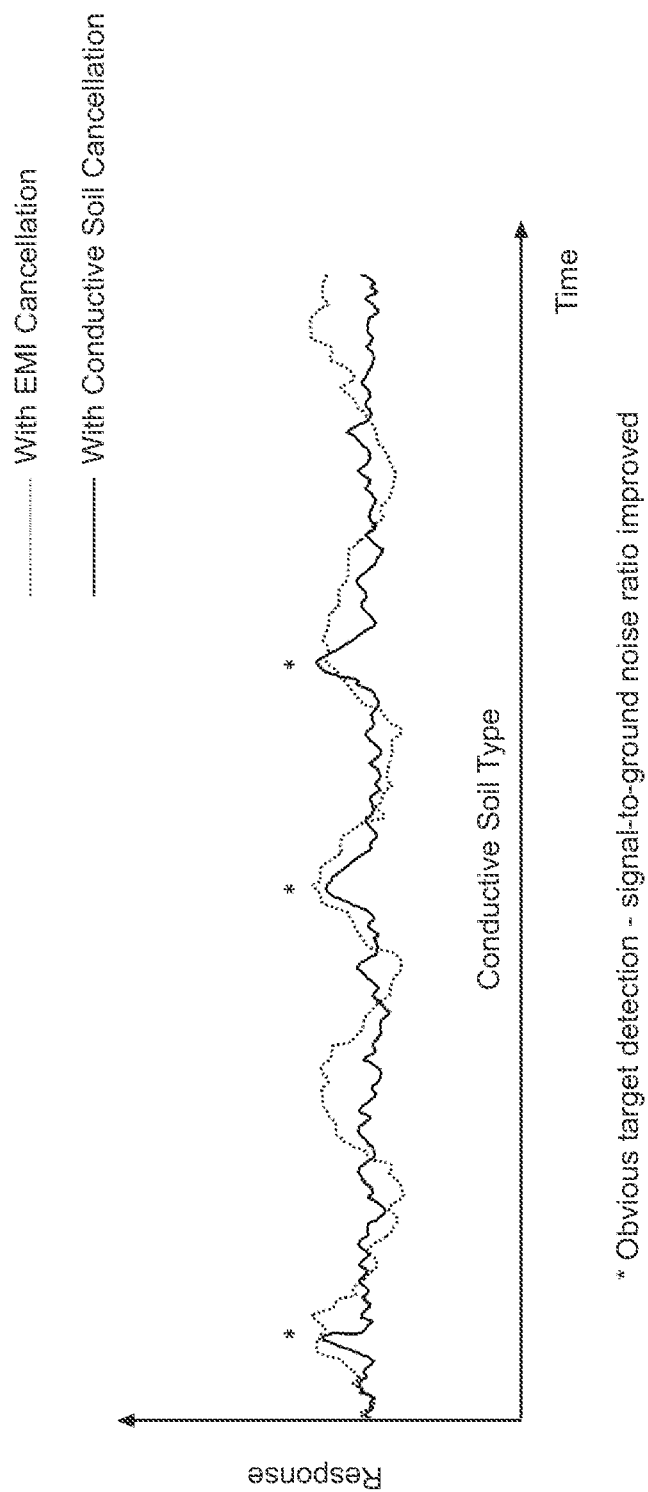
FIG. 4 depicts a graph showing exemplary measurement results obtained to demonstrate the benefits of the present disclosure over the existing EMI cancellation method.

FIG. 4 depicts a graph showing exemplary measurement results obtained to demonstrate the benefits of the present disclosure over the existing EMI cancellation method. The three * indicates detection of a target. Without conductive soil cancellation of the present disclosure, the probability of false detection is much higher as indicated by the trace of the signals of a metal detector with only EMI cancellation, where peaks occur when there is actually no target. For the trace of signals of a metal detector with the conductive soil cancellation of the present disclosure, peaks only occur when there is a target, thus the accuracy of detection of targets on conductive soil improves, with false detection rate reduced or eliminated. Further, even if advanced metal detectors are able to reduce false detection using other known methods, without the conductive soil cancellation of the present disclosure, faint target signals may be drowned by signals due to conductive soil, thus reducing the sensitivity to targets. In other words, targets may be missed in the presence of strong signals due to conductive soil.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It will be understood that the terms "comprise" and "include" and any of their derivatives (eg comprises, comprising, includes, including) as used in this specification is to be taken to be inclusive of features to which the term refers, and is not meant to exclude the presence of any additional features unless otherwise stated or implied The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for detecting a metal target in soil using a metal detector, said method comprising steps of:
   generating, by the metal detector, a transmit magnetic field for transmission into the soil using a transmit winding based on a transmit signal;
   receiving, by the metal detector, a first receive magnetic field using the transmit winding during a receive period to produce a first receive signal;
   receiving, by the metal detector, a second receive magnetic field using a receive winding during the receive period to produce a second receive signal, wherein the transmit winding and the receive winding are separated spatially; and
   producing, by the metal detector, an indicator output signal based on the first receive signal, the second receive signal and at least one synchronous demodulation function;
   wherein the first receive signal comprises first parameters that define a first transfer function transforming the first receive magnetic field into the first receive signal, the first parameters comprising an effective number of turns, a geometry of the transmit winding, and first electronic amplification transfer functions between the transmit winding and first receive signal;

wherein the second receive signal comprises second parameters that define a second transfer function transforming the second receive magnetic field into the second receive signal, the second parameters comprising an effective number of turns, a geometry and a relative orientation of the receive winding with respect to the transmit winding, and second electronic amplification transfer functions between the receive winding and second receive signal;

wherein the first parameters and the second parameters are selected such that the first receive signal and the second receive signal are processed together to reduce or null detected signals within the indicator output signal due to received soil eddy currents from conducting soil components manifested in the first receive signal and the second receive signal; and wherein the selection of the first parameters relative to the second parameters are dependent on the synchronous demodulation function.

2. The method of claim 1, wherein the first receive signal is linearly combined with the second receive signal.

3. The method of claim 1, wherein gains are applied to the first receive signal and the second receive signal through the steps of:

applying, by the metal detector, a first gain to the first receive signal to produce a first gain signal;

applying, by the metal detector, a second gain to the second receive signal to produce a second gain signal, wherein the second gain is lower than the first gain; and processing, by the metal detector, the first gain signal with the second gain signal to reduce or null signals due to conducting soil manifested in different amounts in the first receive signal and the second receive signal.

4. The method of claim 3, wherein the step of processing, by the metal detector, the first gain signal with the second gain signal comprises:

subtracting, by the metal detector, the second gain signal from the first gain signal.

5. The method of claim 1, wherein the transmit winding and the receive winding overlap partially so that the receive winding is nulled with respect to the transmit winding.

6. The method of claim 1, wherein the transmit winding and the receive winding form a double D coil.

7. The method of claim 1, wherein the transmit winding and the receive winding form a concentric coil.

8. The method of claim 3, wherein the second gain is a factor of 0.65 to 0.95 of the first gain.

9. The method of claim 1, wherein the conducting soil components comprise areas of soil with salt content.

10. A non-transitory computer-readable medium comprising code which, when executed by a processor of the detector, causes the metal detector to perform the method of claim 1.

* * * * *

UNITED STATES PATENT AND TRADEMARK OFFICE
CERTIFICATE OF CORRECTION

| | | |
|---|---|---|
| PATENT NO. | : 11,899,156 B2 | |
| APPLICATION NO. | : 17/574858 | |
| DATED | : February 13, 2024 | |
| INVENTOR(S) | : Bruce Halcro Candy et al. | |

It is certified that error appears in the above-identified patent and that said Letters Patent is hereby corrected as shown below:

In the Claims

Column 12, Line 27, Claim 10, before "detector" insert -- metal --

Signed and Sealed this
Ninth Day of April, 2024

Katherine Kelly Vidal
*Director of the United States Patent and Trademark Office*